Aug. 16, 1966   J. W. LUCAS   3,266,407

FILM LOADING AND PRINTING DEVICES

Filed April 14, 1965   3 Sheets-Sheet 1

INVENTOR
James W. Lucas

INVENTOR
James W. Lucas

INVENTOR
James W. Lucas

3,266,407
FILM LOADING AND PRINTING DEVICES
James W. Lucas, 1480 N. Doheny Drive,
Los Angeles, Calif.
Substituted for abandoned application Ser. No. 615,265, Oct. 11, 1956. This application Apr. 14, 1965, Ser. No. 449,929
12 Claims. (Cl. 95—90)

This invention relates to devices for loading perforated motion picture film into light tight cassettes or cartridges and to devices for making prints from negatives exposed in so-called 35 mm. cameras, and more particularly, it relates to a device which is adapted for use as a daylight film loader and a continuous film printer and is further provided with an adjustable light admitting aperture by means of which it may be used to make prints of individual pictures selected from a length of negative film having a plurality of such pictures thereon. This application is a substitute for previous application, Serial No. 615,265, filed Oct. 11, 1956.

The constantly increasing use by amateur and professional photographers of 35 mm. color film which is normally processed into positive transparencies, has in turn served to popularize the viewing of all still pictures by means of projection in place of paper prints. Black-and-white and color negatives however require a printing operation on positive film before they are suited for projection.

Yet there is no continuous printer of any type, at least insofar as I have been able to ascertain by a careful survey of the equipment field, presently available at what might be considered to be a moderate price. And of the few being offered, none has any provision for printing from bulk film stock in daylight. Furthermore, none of the printing devices coming within the scope of my observation include any suitable means for the daylight loading of bulk negative film into individual cassettes for use in a camera. As a consequence, a photographer wishing to load his own cassettes with bulk negative and do the printing operation himself is required to buy a separate comparatively costly device for each purpose and is limited to making prints individually, picture by picture, in a dark room.

My present invention has been made with the foregoing considerations in mind and can be said to have a plurality of important objectives.

A main objective of my invention is the provision of a device being adapted for use in daylight in making continuous film strip prints from film strip negatives and winding the exposed film into light tight cassettes in which it is delivered to the processing laboratory.

Another important object of my invention is the provision of a device of the character described which is further adapted for use in making a single picture print from selected portions of a film strip negative.

An additional important object of my invention is the provision of a device of the character described and being provided with a light admitting aperture adapted for adjustment to accommodate films from various cameras having differently dimensioned picture areas.

A further important object of this invention is the provision of a device of the character described being further adapted for use in loading film from a large roll into individual cassettes such as those used in 35 mm. cameras.

In brief, my invention includes a generally rectangular rigid case having a removable side providing access to a light tight compartment in the center of which is a spindle adapted to receive a large roll of film to be loaded or printed. Light tight slits open outwardly from opposite ends of the compartment, a guide roller being positioned inwardly of one slit and a sprocket journalled outwardly of the other slit. Means are provided below the sprocket for engaging a cassette between the fixed side and the cover of the case, together with a crank which is enterable through the cover for rotation of the winding core within the cassette.

A film positioning panel is disposed between the guide roller and the slit adjacent the sprocket. In the top of the case and centered over this panel is a light admitting aperture one side of which is formed by a jointed closure section which is movable to vary the size of the aperture.

When negative film is loaded into a cassette, the roll of negative film is positioned on the spindle to unroll clockwise and is threaded through the slit adjacent the sprocket, over the sprocket and thence into the cassette into which it is drawn by rotation of the crank engaging the film spool therein.

When prints are to be made, the roll of positive film is positioned on the spindle so as to unroll counter-clockwise and is threaded around the guide roller, across the positioning panel and thence over the sprocket into the cassette, the negative being entered through the slit adjacent the guide roller and drawn while in close juxtaposition with the printing stock across the positioning panel, under the aperture in the top of the case and thence outwardly through a slit disposed along the line of attachment of the sections forming the joined closure member.

Finally, the jointed closure member is relatively positioned so as to reduce the area of the light admitting aperture when making a continuous, non-intermittent printing of a film strip negative, or it may be repositioned outwardly to match the frame size of individual pictures.

Thus the device may be used to load bulk stock film into individual cassettes in daylight and may be differently threaded and employed to make single picture prints or a continuous print of a film strip negative.

Certain variations in the above embodiment and additional important objects of the present invention will be apparent to persons familiar with the general art upon examining the following detailed description together with the references made therein to the accompanying drawings, of which:

Figure 3:
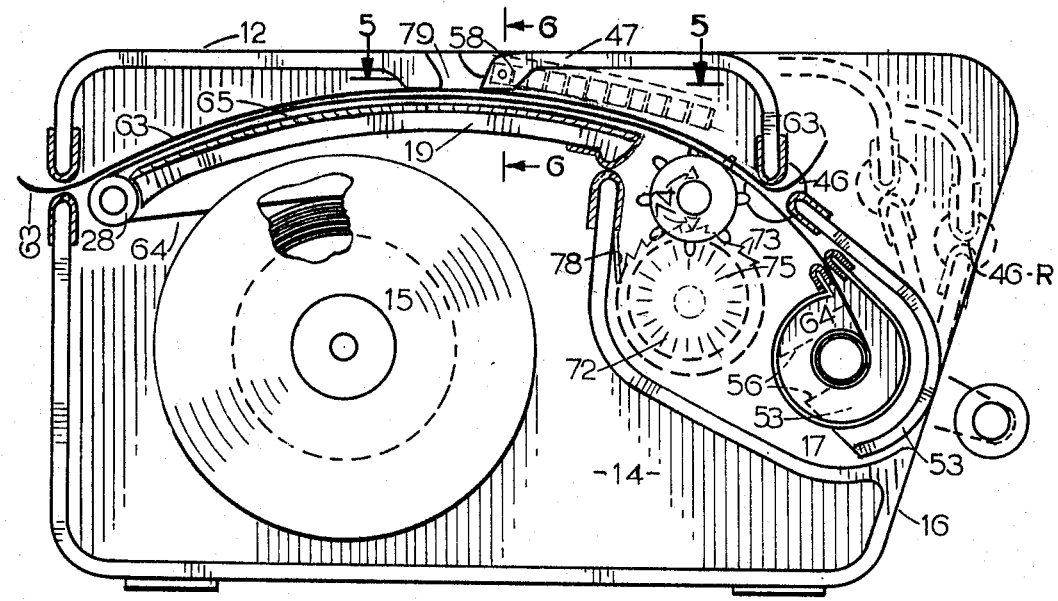
FIGURE 3 is a side elevational view of the device showing the method of threading the film when making a continuous print.
Figure 5:
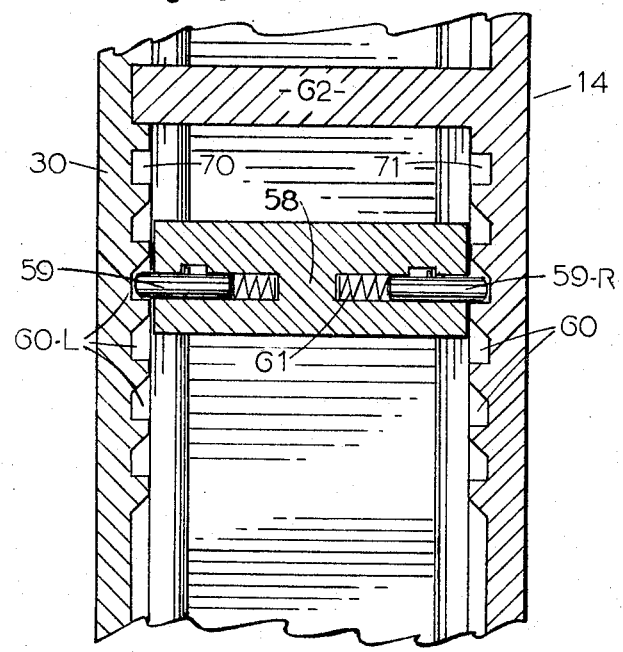
Figure 6:
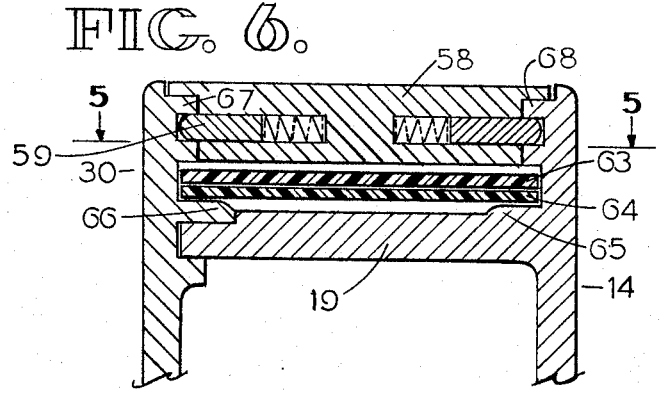

FIGURE 5 is a horizontal sectional view taken along the line 5—5 in FIGURES 3 and 6 through the top of the device adjacent the light admitting aperture therein; and FIGURE 6 is a vertical section taken along the line and in the direction indicated by the arrows 6—6 in FIGURE 3.

Reference is again made to FIGURE 1 which is an exploded view of a loader-printer constructed according to my invention, in which the various portions of the device are shown relatively positioned in the manner in which they would be assembled. A main body portion designated by the numeral 10 is seen to have a generally flat base 11, a parallel top 12, a vertical back 13 and a rigid vertical side 14 into which the spindle 15 is fixedly atached. The low frontal panel 16 is extended upwardly and inwardly in an irregularly conformed partioning member 17 to the slitted aperture 18 adjacent the transverse film positioning panel 19, the central upper surface of which is exposed to light admitted through the aperture partially defined by the opening 20 in the top 12.

Figure 1:
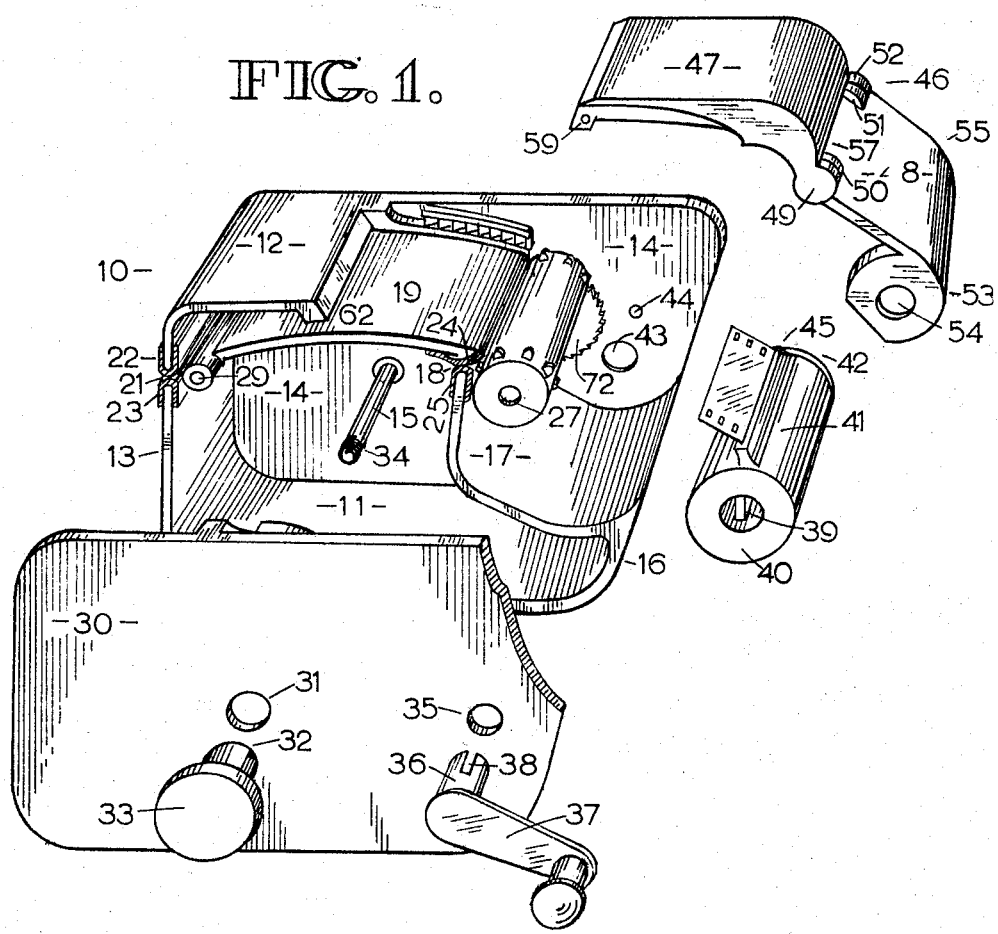
FIGURE 1 is an exploded view in perspective showing the main case and cover and various other removable parts which comprise the invention.
Figure 2:
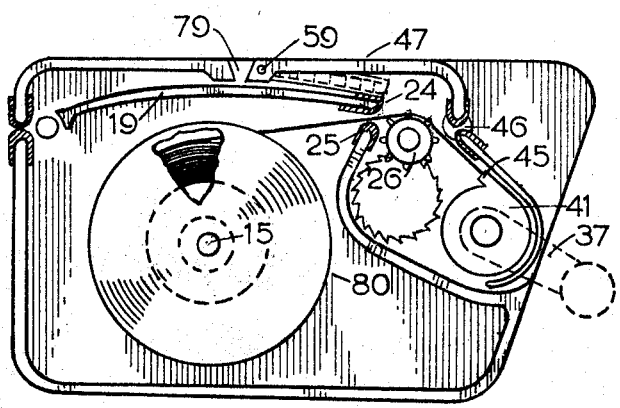
FIGURE 2 is a side elevational view of the interior of the main casing showing the method of threading film being loaded into the cassette.

A second slit 21 is provided in the back 13 and is fitted with fabric bands 22 and 23 to exclude light from the compartment around the spindle 15, the slit 18 being similarly fitted with fabric seals 24 and 25 which are also well seen in FIGURE 2. The sprocket 26 is freely rotatable in either direction on the shaft 27, as also is the guide roller 28 on its respective shaft 29. A cover member 30, also seen in FIGURE 1, is conformed similarly to the stationary vertical side 14 and is provided with an aperture 31 through which the internally threaded hub 32 of the knurled knob 33 is enterable to engage the threaded end 34 of the spindle 15.

A second aperture 35 is provided in the cover 30 to receive the shank end 36 of the crank member 37 which is slotted as seen at 38 to engage the transverse spool-driving core portion 39 in the open end 40 of the cassette 41.

Since the cassette used with the device is the type most generally used in the photographic industry, it is not illustrated in detail herewith. However, it includes a cylindrical shell having a longitudinal fabric-lined slit therein and circular members adapted to press fit over each end of the shell and having axial holes adapted to receive opposite tubular hub portions of a flanged film winding spool. Diametrically disposed interiorly of one of the hub portions is a transverse core portion which interfits with a slot in the shank end of a crank member, the rotation of which serves to wind film entered through the slit onto the spool.

Referring again to FIGURE 1, the circular recess 43 in the vertical side 14 is adapted to receive the hub portion of the spool extending outwardly through the end 42 of the cassette, and a small stud 44 is extended inwardly from the side 14 so as to engage the film receiving extension 45 of the cassette 41 and prevent it from rotating as the crank 37 is turned.

The jointed closure member 46 is seen to be composed of an upper generally horizontal section 47 and a lower substantially vertically disposed section 48 which are pivotally attached by means of their abutting flanges 49 and 50 and 51 and 52.

Figure 4:
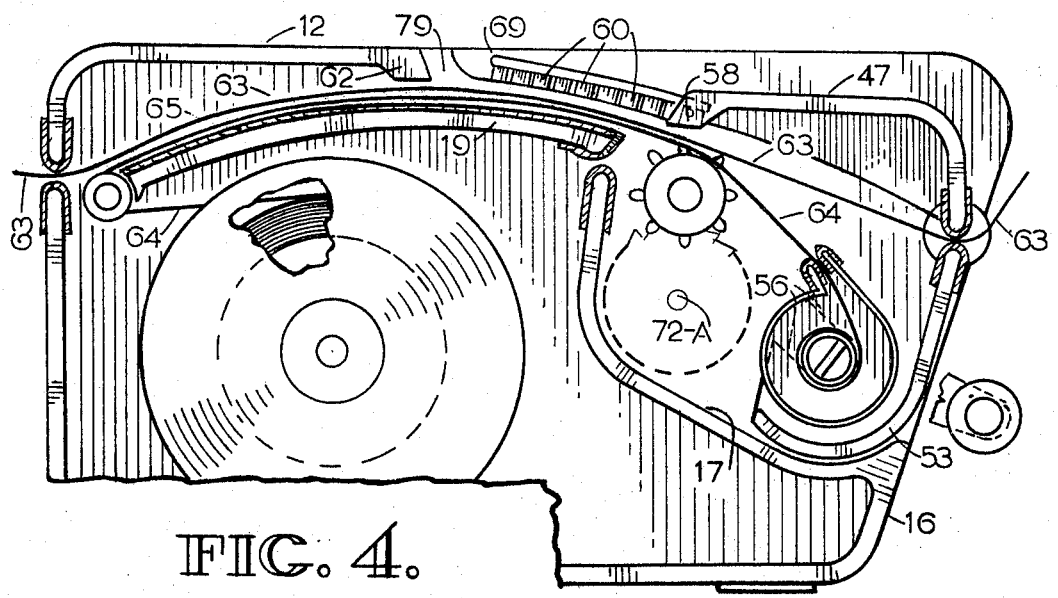
FIGURE 4 is a fragmentary side elevational view similar to FIGURE 3, showing the positioning of the corner closure section when making single frame prints.

The lower portion 48 of the closure member 46 is curved inwardly at its lower end 53 and provided with an aperture 54 which receives the shank 36 of the crank 37 when it is inserted through the aperture 35 is the cover member 30, and is extended similarly along its opposite side 55 better seen in FIGURES 3 and 4, and is provided with a slot 56 which fits over the hub extending from the end 42 of the cassette and normally entered within the recess 43 in the side 14.

The closure 46 is provided with a fabric-lined slot 57 along the line of the pivotal juncture of its sections 47 and 48, and the end 58 of the horizontal section 47 is fitted with opposite pins such as 59 which serve to engage a plurality of saw-tooth detents 60 disposed in the side 14 adjacent the upper opening 20 and interiorly of the portion of the cover 30 which aligns immediately above the positioning panel 19 when the door 30 is secured in place by means of the threaded knob 33.

Reference is made to FIGURES 5 and 6 which show more clearly the manner in which the pins and detents cooperate to hold the closure 46 in the desired position. FIGURE 5 is taken along the line and in the direction indicated by the arrows 5—5 in FIGURES 3 and 6, and FIGURE 6 is vertical section taken along the line indicated by the arrows 6—6 in FIGURE 3; both FIGURES 5 and 6 show the structure with the cover member 30 in place. It will be observed in FIGURE 5 that a plurality of detents such as 60 are disposed in the inner surface of the vertical side-wall 14, and a similar plurality of oppositely matching detents indicated as 60–L is disposed in the inner surface of the cover member 30. The lower portion of the end 58 of the horizontal section 47 of the closure member 46 is seen to enclose a coil spring 61 disposed between the pins 59 and 59–R, which for the sake of clarity are not shown in section, and urges the pins outwardly into engagement within the detents 60–L and 60, respectively. Also shown in FIGURE 5 is the lower portion 62 of the top case section 12.

In the vertical sectional view of FIGURE 6, the negative and positive films, 63 and 64 respectively, are seen in position beneath the extended end 58 of the closure section 47, and above the film positioning panel 19, the lower film 64 actually resting upon a ridge 65 extending upwardly from the panel 19, and a similar ridge 66 projecting inwardly from the cover member 30. Also shown, but not in section, are the pins 59 and 59–R and the spring 61 urging the pins outwardly of the end portion 58 and into engagement with the detents as previously set forth.

Seen at 67 and 68 in FIGURE 6 are projections which extend inwardly from the cover 30 and the vertical side 14 and are terminated at the point 69 best seen in FIGURES 1 and 4; thus the spaces shown in the cover 30 at 70 and the sidewall 14 at 71 in FIGURE 5 actually open upwardly and when the closure section 47 is moved in the direction indicated by the arrow K in FIGURE 5 so that the pins 59 and 59–R enter the spaces 70 and 71, the end 58 of the closure section 47 may be lifted upwardly and outwardly of the case for purposes of removal therefrom or repositioning in another pair of detents.

In this manner the pivoted closure member 46 may be variously positioned as indicated in phantom in FIGURE 3 at 46–R and 46–M to provide any predetermined spacing between the end 62 of the top 12 and the end 58 of the closure section 47, the smallest aperture therebetween being indicated by the relative positioning shown in FIGURE 3, and the widest aperture being illustrated in FIGURE 4. As the enclosure section 47 is moved laterally to decrease the width of the aperture, the end 53 of the closure section 48 moves outwardly above the arcuate portion of the partitioning panel 17 adjacent the front end 16 from the position shown in FIGURE 4 to that indicated in FIGURE 3.

A counting device, best seen in FIGURE 3, is journalled at 72–A to the vertical side 14 of the case and includes a wheel 72 having teeth such as 73 around its circumferential periphery which are engaged upon rotation of the sprocket 26 by pins such as 74, each such engagement being effective to rotate the wheel one position relative to a numerical scale 75 on a calibrated dial disposed exteriorly of the sidewall 14. The sprocket 26 is provided with a plurality of teeth such as 77 which engage within the sprocket holes of the film, and one pin such as 74 is provided for each four sprocket teeth so that each additional numeral on the scale 75 indicates the passage of one standard motion picture frame of film. A spring tensioned dog member 78 is provided to prevent the rotation of the wheel 72 in the reverse direction.

As a result of its structural features hereinbefore described, the device may be employed for several different purposes.

When the device is used for loading bulk stock negative film into individual cassettes in daylight, the large roll of negative film such as 80 in FIGURE 2 is positioned on the spindle 15 interiorly of the case so as to unroll clockwise, and the film is threaded through the slit 18, between the fabric liners 24 and 25, and over the sprocket 26. The cover member 30 is then fitted onto the open side of the case and the internally threaded hub 32 of the knurled knob 33 is entered through the aperture 31 and tightened on the threaded end 34 of the spindle 15.

The end of the film left exposed outwardly of the slit 18 is then threaded through the throat portion 45 of a cassette such as 41, and attached with a patch of adhesive tape to the tubular hub of the film spool. When re-assembled, the cassette 41 is positioned between the side 14 and the cover 30 by first engaging its outwardly extended hub portion within the notch 56 shown in FIGURES 3 and 4 in the side 55 of the arcuate lower end 53 of the closure section 48 and thence into recess 43, seen in FIGURE 1, in the vertical side 14; then the shank end 36 of the crank 37 is inserted through the aperture 35 in the cover 30 and through the aperture in the side 54 of the arcuate end 53 of the closure section 48, and the crank is adjusted so that the slot 38 in the end thereof engages the transverse core portion 39 diametrically disposed interiorly of the end 40 of the cassette. The horizontal section 47 of the closure member 46 is then positioned by engagement of the pins, such as 59, within the detents 60 in the manner previously described.

When the counter wheel 72 has been set back to zero, the crank 37 is rotated until the desired length of film has been wound into the cassette. The film is then severed between the sprockets 26 and the throat portion 45 of the cassette, and the cassette is removed from the case by a reversal of the installation procedure described above. If care is taken to leave the end of the negative film extending outwardly of the slit 18, the loading operation may be repeated as often as desired without removing the cover 30.

As will be understood by reference to FIGURE 2, any light entering the case through the aperture 79 in the top 12 will be arrested by the transverse film positioning panel 19 and thereby prevented from exposing the film as it is wound by means of the crank 37 into the cassette 41.

When the device is used for printing, a large roll of positive film, indicated at 81 in FIGURE 3, is positioned on the sipndle 15 so as to unroll counter-clockwise, and the film 64 is threaded around the guide roller 28, across the supporting ridges 65 of the film positioning panel 19, over the sprocket 26 and thence into the cassette 41. The negative film, indicated by the numeral 63 in FIGURE 3, is then entered through the slit 21 in the back 13 of the case and carried above the positive film over the film positioning panel 19 and the sprocket 26, and thence outwardly through the slit 57 between the pivoted sections 47 and 48 of the closure member 46.

As will be understood by persons familiar with the art, a comparatively small light-admitting aperture, such as 79, is required in continuous printing, and the end 58 of the closure section 47 is moved adjacent the end 62 of the top 12 thereby bringing the protrusion adjacent to slit 57 in the closure member 46 close to the sprocket 26 causing the negative film 63 to bend downwardly over the sprocket 26 and thereby be engaged by the teeth 77 of the sprocket.

As the positive film 64 is wound by means of the crank 37 into the cassette 41, the negative film 63 is simultaneously drawn inwardly through the slit 21, then across the film positioning panel 19 while in close contact with the positive film 64 thereunder, over the sprocket 26 and outwardly of the slit 57. The light admitted through the aperture 79 in the top 12 of the case is effective to expose photographic images from the negative film 63 onto the emulsion of the positive film 64 therebelow.

When individual pictures on the negative are to be printed, the threading of the positive and negative films within the device is the same as that last described but the closure section 47 is positioned with its end 58 spaced from the end portion 62 of the top 12 so as to align respectively with the opposite ends of an individual picture to be reproduced from the negative. Adjustments according to the lineal dimension of pictures made by different makes of cameras are made by selecting the appropriate pair of detents 60 to receive the pins 59 in the end 58 of the closure section 47.

Because of the necessity of positioning the negative film 63 over the positive film 64 before exposure to a printing light, this operation must be performed under a safe light and the printing light turned on only when the picture to be printed is properly placed in the opening between the end portions 62 and 58 when spaced as indicated in FIGURE 4. After the printing exposure is made, the positive film is then wound toward the cassette in the manner previously described.

As can be seen in FIGURE 4, the negative film 63 is not completely engaged by the teeth 77 of the sprocket 26 and consequently may be drawn outwardly through the split 57 to reposition it relative to the positive film 64. By reference to the counter device, the operator is advised when the cassette is sufficiently filled with printed film and thereupon replaces the filled cassette with an empty one, and the printing operation is continued.

The cassettes are replaced by removing the crank 37 and swinging the jointed closure member 46 upwardly relative to the pins 59. In this manner the same frame or picture size is maintained and the negative need not be removed or dislocated when an empty cassette is required. Or, if the operator prefers, a new negative may be fed through the slot 57 at the time of replacing the cassette. The filled cassettes are used as containers in which the undeveloped film is shipped to the laboratory for processing.

It is not to be implied from certain references made in the foregoing description to 35 mm. film that my invention is meant to be limited to any manner of use with film of that particular size. Instead the invention is seen to encompass similar devices adapted for use with smaller film such as 16 mm. and with films wider than 35 mm. such as those now being used in certain wide-frame motion picture reproduction processes.

Thus, as has been said, the device may be used for loading film into a cassette in daylight, and may be differently threaded and employed as a continuous or single frame printer.

Although in order to comply with the statute my invention has been described in considerable detail in the form of a particular embodiment, it is to be understood that the details are subject to variation and change and the embodiment is subject to numerous modifications and the invention itself is amenable to adaptation into a plurality of different embodiments, and therefore it is not to be limited to the particular form described and illustrated herewith nor restricted in any manner except as may be indicated by the extent of the following claims.

What I claim as my invention is:

1. A film winding device for use in the daylight loading of bulk film into individual cassettes, comprising: a generally rectangular case having a removable side defining a cover, and a fixed side parallel to said cover being formed integrally with the wall sections of the case to provide a light-tight compartment therein; said cover and said fixed side having parallel end portions extended outwardly beyond one side of said light-tight compartment; spindle means for supporting a roll of bulk film interiorly of said compartment; a light-tight slit opening outwardly of said compartment between said extended end portions, and film guide means disposed adjacent and outwardly of said slit; a recess in the inner surface of said extended end portion of said fixed side, said recess being adapted to receive therein the outwardly extended hub of the winding spool of a film cassette; an aperture in said end portion of said cover opposite from said recess in said fixed side; crank means including a shaft being enterable through said aperture and adapted for interfitting engagement with said winding spool in a cassette, said shaft being effective to hold said cassette in axial alignment with said recess and said aperture and to rotate said spool interiorly of said cassette whereby film from a bulk roll supported on said spindle in said light-tight compartment and threaded through said slit, over said guide means and onto said spool, is wound into said cassette when said crank is turned; means for removably securing said cover on said case, and removable closure means being extended upwardly from a point below said cassette to a point above said slit and being adapted to interfit between said parallel extended end portions of said cover and said fixed side and effective to exclude light from film while passing from said slit, over said guide means and into a cassette.

2. A film winding device as described in claim 1 and further characterized by combined cover locking and film supporting means, comprising: said spindle member being fixedly attached at right angles to said inner surface of said fixed side of said case centrally of said light-tight compartment and being terminated adjacent said cover in an externally threaded end section; a circular perforation in said cover disposed in axial alignment with said spindle; a circular knurled knob having an extended hub portion of diminished diameter enterable within said perforation and being threadedly engageable with said spindle, said knob and hub being thereby effective to hold said cover in place over said case, and said hub being effective interiorly of said compartment to hold said roll of film securely positioned longitudinally of said spindle and in proper alignment with said slit.

3. The invention in accordance with claim 2 and in which said film guide means disposed between said extended end portions of said cover and said fixed side adjacent said slit in said light-tight compartment, comprises: a film sprocket member having flanged sections at each end thereof, said flanged sections having a plurality of teeth extended radially therefrom, said teeth being engageable within the perforations in motion picture film and perforated photographic printing paper; said sprocket being rotatably journalled on a pin member disposed at right angles to the inner surface of said extended end portion of said fixed side, and being positioned relative to said slit whereby the film from said bulk roll, when threaded through said slit and over said sprocket, is guided squarely into a cassette and onto the winding spool therein.

4. The film winding device as set forth in claim 3 in which said removable closure means comprises: a jointed closure assembly including two generally rectangular rigid sections being pivotally attached and adapted in width to interfit between said parallel extended end portions of said case; the free end of one rigid section being arcuately conformed so as to fit under and partially around a cassette to be loaded with film, and the spaced end of the other rigid section being provided with laterally extended pin members being removably engageable in oppositely disposed notched detents in the inner surfaces of said extended end portions whereby said closure assembly is removably positionable between said extended end portions and effective to exclude light from film disposed between said slit and said cassette.

5. A film winding device for loading individual cassettes from a roll of bulk film in daylight, comprising: a rigid case being generally rectangular and including a bottom section normally disposed horizontally in space, and a normally upright back section, a partial top section extended forwardly from said back and a partial front section extended upwardly from said bottom, a fixed upright side conformed integrally with said top, bottom, front and back, and a removable side being disposed parallel to said fixed side and defining a light-tight cover; said case also including an arcuate film positioning panel disposed immediately below and extended forwardly beyond said partial top, and a generally concave partitioning section being disposed downwardly from a point immediately adjacent the forward end of said film positioning panel then curved forwardly and joined at its lower end to the top of said partial front section; said positioning panel and said partitioning section being fixedly attached along one edge to said fixed upright side, the adjacent ends of said positioning panel and said partitioning section being covered with a flexible material so as to provide a light-tight frontal slit therebetween whereby a light-tight compartment is provided within said case; said fixed side and said cover being terminated frontally of said case in end portions extended forwardly beyond said partitioning section; a spindle member being extended at right angles from said fixed side and adapted to support a roll of bulk film in said light-tight compartment; means for positioning a light-tight cassette having a rotatable winding spool therein between said end portions of said fixed side and said cover outwardly of said partitioning section and in the concave area thereof; film guide means being rotatably disposed outwardly of said light-tight compartment adjacent said frontal slit therein, said guide means being adapted to engage film from a roll mounted on said spindle and threaded through said frontal slit, and guide said film downwardly into said cassette; crank means being operable exteriorly of said case and adapted to rotate said spool and wind film being attached to said spool from said roll into said cassette, and removable closure means having a light-tight film egress slit therein and adapted to fit between said extended end portions of said cover and said fixed side and being effective to exclude light from said film while moving from said frontal slit into said cassette.

6. The invention as set forth in claim 5 together with additional film guide means, comprising: a light-tight film ingress slit opening outwardly of said light-tight compartment through said back of said case adjacent the jointure thereof with said partial top, and a film guide roller extending at right angles from said fixed side adjacent and between said ingress slit and the rearward end of said film positioning panel.

7. A film winding device adapted for loading film into cassettes and for printing positive film from film negatives, including the invention as described in claim 6 in which the uppermost film supporting surfaces on the circumferential periphery of said guide roller are disposed in coplanar alignment with said ingress slit and the adjacent upper surface of said film positioning panel whereby either an exposed and developed negative film entered into said case through said ingress slit and outwardly of said case through said egress slit in said removable closure means, or a section of unexposed positive film from a bulk roll supported on said spindle then drawn upwardly and positioned over said roller, is guided directly onto the upper surface of said film positioning panel and beneath the exposure aperture provided thereabove.

8. The invention as set forth in claim 7 in which said film guide means disposed adjacent said frontal slit comprises: a film engaging idler sprocket being rotatably journalled in said case; said sprocket having flanged sections at each end thereof, a plurality of teeth being extended radially from said flanged sections; said teeth being adapted in length, and said sprocket being positioned relative to said frontal slit and to the adjacent upper surface of said film positioning panel whereby said teeth are readily engageable in film moving outwardly of said light-tight compartment through said frontal slit and, additionally, are engageable in the perforations of a pair of films used in making film prints including an unexposed positive film drawn from a bulk roll in said light-tight compartment and threaded around said guide roller, across said film positioning panel and said sprocket and thence into said cassette, and a negative film strip entered inwardly of said case through said ingress slit and outwardly of said case through said egress slit and superposed upon said positive film longitudinally of said positioning panel, said sprocket teeth and the engagement thereof simultaneously within aligning perforations in both said negative and said positive films, and being effective to maintain the congruity of contact and exact longitudinal coincidence of said superposed films while transiting said film positioning panel.

9. The invention in accordance with claim 8 in which said means for supporting a film cassette between said extended end portions of said case in said concave area of said partitioning section comprise: a circular recess in the inner surface of said fixed side of said case and a circular perforation in said cover being axially aligned with said recess; said recess being adapted to receive the outwardly extended hub portion of the winding spool of a cassette; crank means including a shaft being enterable through said perforation in said cover, the end of said shaft being adapted for interfitting engagement with the adjacent end of said spool, said shaft being thereby effective to hold said cassette between said extended end portions in axial alignment with said recess and said aperture and to rotate said spool interiorly of said cassette whereby unexposed negative film to be loaded into the cassette may be threaded through said frontal slit and over said sprocket and wound therefrom into said cassette by turning said crank, or, if prints are to be made, a bulk roll of unexposed positive film may be loaded in said light-tight compartment and threaded over said guide roller adjacent said ingress slit and thence over said film positioning panel and said sprocket and wound therefrom into said cassette upon rotation of said crank means exteriorly of said cover.

10. The invention as set forth in claim 9 in which said closure means comprises: a pair of generally rectangular sections being pivotally attached endwise in a manner providing a light-tight slit therebetween, one of said sections being arcuately conformed longitudinally at one end so as to interfit with said concave area of said partitioning panel adjacent said cassette, and the spaced end of the other section being provided with a pair of positioning pins, said pins being urged laterally outwardly of said end by a compression means disposed therebetween; a plurality of notched detents being oppositely disposed in the inner surfaces of said fixed side and said cover above said film positioning panel, each successive opposite pair of said detents being spaced more distantly from said frontally disposed end of said partial top of said case and being adapted to receive said pins therein and to support said end of said closure means at any predetermined spacing from said frontal end of said case whereby said closure means is fully adjustable to provide either a small light admitting aperture suited for the continuous printing of picture images from negative film onto positive film in daylight or a larger aperture as required to fit the frame line of single or double frame pictures when making single prints of individual pictures from selected portions of a film negative.

11. In a photographic printer of the type suited for printing selected portions of a film strip negative, the improvement consisting of: a film-engaging sprocket and a movable closure containing an internal protrusion, one edge of said closure defining a variable film exposure area, said protrusion being effective to hold two films in engagement with said sprocket when said film exposure area is of a width usable for continuous printing.

12. A photographic printer comprising a case having an ingress opening for negative film, a cover, a light-tight bulk film compartment defined by said case and said cover and having at least one opening for egress of said bulk film, a film engaging sprocket rotatably mounted in said case, a film supporting panel extending from said bulk film egress opening toward said sprocket, means for rotatably mounting a film cassette spool in said case, means for rotating said spool to wind said bulk film into said film cassette, and a movable closure member having an opening for egress of negative film, one end of said closure member defining one edge of an exposure area for said bulk film, and said closure member having an internal protrusion effective to hold said negative film in engagement with said sprocket only when said film exposure area is of a width usable for continuous printing.

References Cited by the Examiner

UNITED STATES PATENTS

| | | | |
|---|---|---|---|
| 2,158,001 | 5/1939 | Dazey | 95—75 |
| 2,298,339 | 10/1942 | Boes | 242—55.13 |
| 2,819,663 | 1/1958 | Lachaize | 352—78 X |

FOREIGN PATENTS 423,159  12/1925  Germany.

JULIA E. COINER, *Primary Examiner.*